Figure 11:
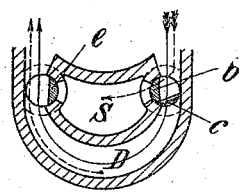

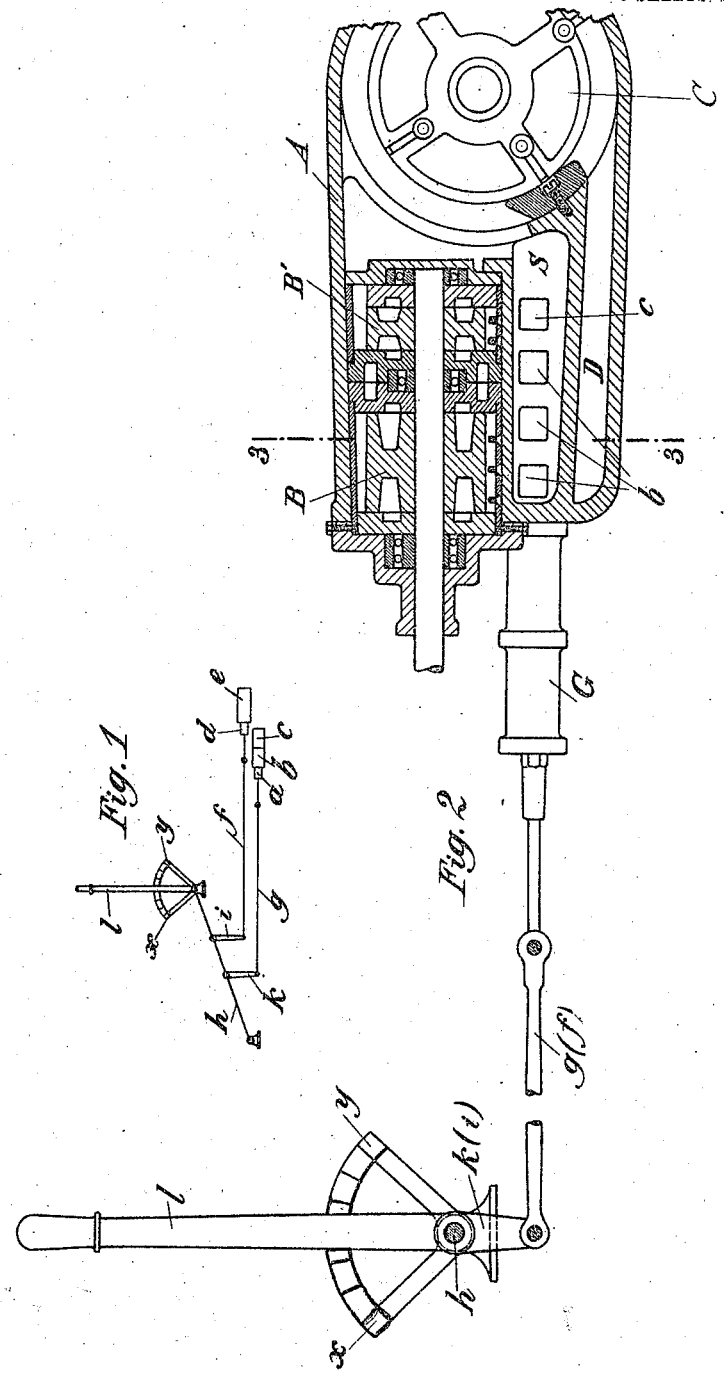

H. LENTZ.
MEANS FOR CONTROLLING FLUID TRANSMISSION GEAR.
APPLICATION FILED MAY 20, 1911.
1,133,867. Patented Mar. 30, 1915.
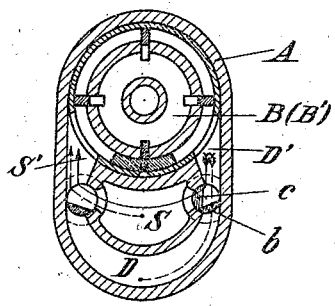
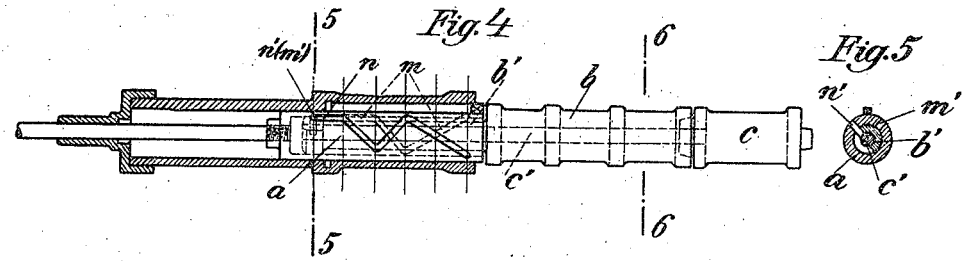
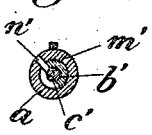
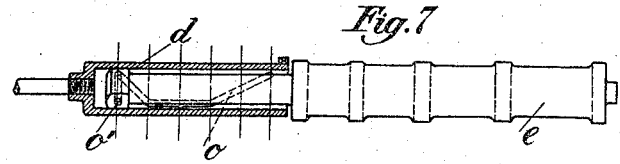
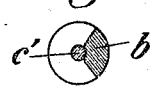
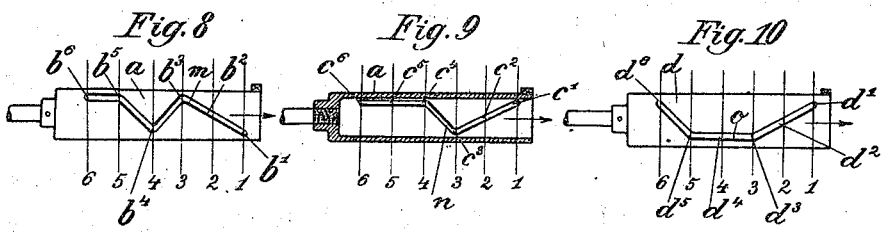
INVENTOR
HUGO LENTZ

UNITED STATES PATENT OFFICE.

HUGO LENTZ, OF GRUNWALD, NEAR BERLIN, GERMANY.

MEANS FOR CONTROLLING FLUID-TRANSMISSION GEAR.

1,133,867. Specification of Letters Patent. Patented Mar. 30, 1915.

Application filed May 20, 1911. Serial No. 628,594.

*To all whom it may concern:*

Be it known that I, HUGO LENTZ, a subject of the German Emperor, and residing at Grunwald, near Berlin, Germany, have invented a new and useful Means for Controlling Fluid-Transmission Gear; and I do hereby declare the following to be a full, clear, and exact description of the same.

The present invention relates to improvements in the valve controlled fluid-transmission gear described in my co-pending application Serial No. 594,192, filed Nov. 25, 1910. In the said application are described and claimed controlling means whereby a plurality of valves are controlled by a single device, during its progressive movement from one position to another.

The present invention relates more particularly to a modification of the above mentioned gear whereby is provided a fluid-transmission gear wherein the braking relation is established only after the device has been moved to and past the position giving highest speed. However, it is noted that the claims herein are not at all limited to the details of construction of the device.

In the gear herein shown, the passages connecting the pumps to the motor, and the motor to the pumps, have such a shape as will prevent as far as possible any change in direction of the transmission fluid. This arrangement is claimed in my co-pending application, Serial No. 629,041, filed May 23, 1911. Aside from the recited considerations, I have found (as hereinafter more fully explained) that it is highly advantageous, especially when a single handle is used to control all valves and the braking, that the braking, by the driven liquid, shall occur immediately after the liquid motor has attained its highest speed; in such case, the extent of movement of the lever—in order to reach the brake position, in case of danger upon throwing in the highest speed—is the shortest. Each of the advantages before outlined is attained by the arrangement hereinafter described and claimed.

In the drawings Figure 1 shows diagrammatically and in perspective the lever rods for adjustment of the slide-valves; Fig. 2 a longitudinal section through the liquid gear and the controlling device; Fig. 3 a section along line 3—3 of Fig. 2. Fig. 4 shows the speed valve *b c* together with the controlling slide *a* in longitudinal section. Fig. 5 a section along 5—5 of Fig. 4, and Fig. 6 a section along 6—6 of Fig. 4; Fig. 7 shows the reverse slide-valve *e* together with the slide *d* in longitudinal section. Fig. 8 represents an elevation of a cam sleeve for the co-axial group of slide-valves and Fig. 9 the same sleeve in section. Fig. 10 shows an elevation of the cam sleeve for the reverse slide-valve. Figs. 11 to 16 show the slide-valve positions of the gear arranged for three gear ratios, for the reverses running light, first, second and third speed and braking the gear.

As is apparent from Figs. 2 and 3, the liquid gear for which the adjusting device for the control slide valves, forming the subject matter of the invention, is intended, consists of a closed casing A, within which, adjacent to one another, are arranged the pump set B, B' and the motor set C. In the present case the pump set consists of 2 pumps B, B', the delivery capacities of which are, due to the different widths of the piston, in a ratio of 2–1. The quantity of liquid delivered by one or both of the pumps B, B' is forced through the pressure passage D' and the pressure chamber D through to the motors C and after accomplishing its work into the suction chamber S and thence back to the pumps B, B' through the suction passage S'. Each of the pumps B, B' is adjustable by itself and in such manner that by means of the suitably formed controlling devices shown, for the sake of example, in Figs. 4, 5, 6 and 7, the working liquid can be discharged either into the pressure chamber D or into the suction chamber S'. In the case of the large pump B this purpose is served by the control member *b* which, by means of the pin *m'* provided on its prolongation *b'*, engages the groove *m* of the sleeve *a*, as will be later explained more in detail in the description of Fig. 8. For the small pump the control member *c* serves, the prolongation *c'* of which passes through the central member *b* as well as through the prolongation *b'* of the latter. At the end of this prolongation *c'* is provided a pin *n'* which slides in the groove *n* of the same sleeve *a*, as will be later explained in the description of Fig. 9. By adjusting the separate pumps, B or B', or both pumps B, B' together, various speeds corresponding to the various quantities delivered are obtained, as will be clearly explained in the description of Figs. 11 to 16.

The sleeve $a$ of the described controlling member is mounted in a casing G, which is fastened to the liquid gear casing A, as shown in Fig. 2. Parallel with the casing G is attached to the casing A a second similar casing, in which a sleeve is mounted for actuating the reverse member. In the groove $o$ of this sleeve $d$ is guided the pin $o'$ of the reversing member $e$, and by proper positioning thereof, as is clearly explained in the description of Figs. 10 to 16, the stream forced by the pumps can be either conducted to the motors, which then immediately run in the reverse direction (backward) or directly back to the pumps so that no work takes place, and thence the device runs light. Each valve is adapted to cover and uncover, at predetermined times, ports either of one channel or another, and the rocking or other movement of each valve (for such purpose) is controlled by a slide having a zig-zag or other angular groove engaged by a projection carried by or connected with the valve. It is obvious that movements of the slide will cause, correspondingly, movements of the valve, the extent and direction of such movements being dependent upon the direction and the angularity of the grooves or slots in the slides. A slide may control but one valve (thus $e$ alone is controlled by slide $d$, as hereinafter described), or a slide may control a plurality of valves (thus slide $a$ may, as hereinafter described, control two valves $b$ and $c$, which, at times, move in opposite directions). All such slides may be connected to a common operating part—as rocking bar $h$, having an operating handle $l$ secured thereto. Figs. 8 and 9 are different views of the same non-rotatable slide $a$, this being hollow and provided, along one side with a slot $m$, for engagement by a projection carried by or connected with a valve $b$ corresponding to the large pump; along its other side the slide has another slot, $n$, for engagement by a projection carried by or connected with a valve $c$, corresponding to the smaller pump. As shown in Fig. 1, said valves are arranged in series relatively to the slide; they are movable independently one of the other, and rotatable with respect to said slide.

Referring to Fig. 10, this illustrates in side view, another slide $d$, which may also be hollow, provided along one side with a slot $o$ for engagement by a projection carried by or connected with a reversing valve $e$ which is employed also for braking the apparatus, or for driving the fluid at no load. Each slide ($a$ and $d$) is coupled to a rocking shaft or bar $h$, by means of tie-rods or links $g$ and $f$ connected to arms or levers $k$ and $i$ secured to and moving with $h$. The shaft $h$ is rocked, in either direction and to any extent desired by the hand-lever $l$, the extreme positions of which are indicated by $x$ and $y$.

Figure 14:
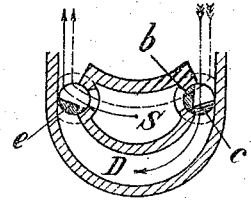
Figure 12:
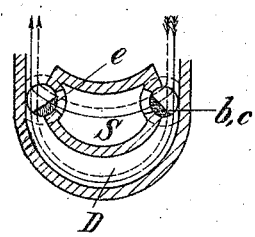
Figure 15:
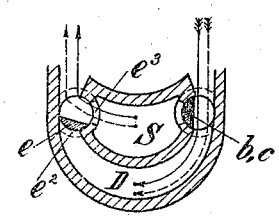
Figure 13:
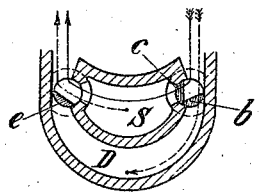
Figure 16:
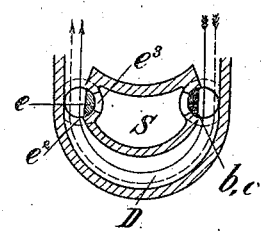

Before starting the explosion or other engine, the lever $l$ is at the position indicated at $y$, and all of the slide-valve positions corresponding to the lines 1, that is to say, valve $b$ is at the position $b'$, valve $c$ is at position $c'$, and valve $d$ is at position $d'$. Thereupon, the reversing of the gear is brought about, since (as shown in Fig. 11) the valve $c$ opens the entrance to a suction-chamber or canal S, which immediately becomes a pressure chamber or canal, for liquid discharged from the small pressure pump, while the liquid forced by the larger pump takes the course indicated by the continuous line—that is through the chamber D, circulating through the same and around its pump without striking against the mentioned liquid motor. Upon movement of the lever $l$, to the desired extent, all three slides are moved to the positions corresponding to lines 2 in Figs. 8–10, valve $b$ being at position $b^2$, valve $c$ being at position $c^2$, and valve $d$ being at position $d^2$, all being the positions shown in Fig. 12 which corresponds to no-load of the gear. All ports are half opened, so that liquid coming from both the large and small pumps can enter both chambers or canals D and S. The next forward movement of the lever $l$, moves all slides to the positions corresponding to lines 3 in Figs. 8–10, valve $b$ being at position $b^3$, valve $c$ being at position $c^3$, and valve $d$ being at position $d^3$. Valve $c$ then keeps its port open (see Fig. 13) to the pressure chamber D, whereupon the liquid from the small pump alone comes into operation, this alone passing from the pressure-chamber D to suction chamber S; this corresponds to the first or low speed of the motor. The third forward movement of the lever $l$ moves all slides to the positions corresponding to lines 4 of Figs. 8, 9 and 10, the valves $b$, $c$, and $d$ being, respectively, at the positions $b^4$, $c^4$ and $d^4$. This, as shown in Fig. 14, represents the second speed of the motor, since the valve $b$ connects the larger pump with pressure-chamber D, and the forced liquid from that pump alone passes from said chamber to the suction-chamber. A fourth forward movement of the lever $l$ moves the two slides to the positions corresponding to lines 5 of each, the valves $b$, $c$ and $d$ being, respectively, at the positions $b^5$, $c^5$ and $d^5$. The two valves $b$ and $c$ both conduct the pumped liquid directly into the chamber D (see Fig. 15) and, after operating a motor or motors, to the suction-chamber S. This corresponds to the highest speed of the apparatus. It will be noticed that after the second movement of lever $l$, and including the fifth movement, the valve $e$ maintains, fully open, the left hand port or ports $e^3$ leading from the chamber or canal S to the pump and also maintains, fully closed, the left-hand port $e^2$ leading from chamber D to the pump. The port $e^3$ (or there may be two of these) should be large enough not to interrupt or offer excessive resistance to the flow of the liquid. The same should be true of port $e^2$.

Of course, the handle $l$ may be moved either forwardly or reversely, to any extent desired, either increasing or decreasing the speed. However, it is desirable, especially in case of danger (most likely at the highest speed of the gear) to effect braking quickly and by a short continuation of the movement of the hand-lever $l$. To effect this, the final movement (to the point $x$ of Fig. 1) moves the two slides, $a$ and $d$, to the positions corresponding to lines 6 of each, the valves $b$ and $c$ remaining as before, while valve $e$ is moved to close the port, or ports $e^3$ (thus shutting off the suction chamber or canal, S) and to fully open the port $e^2$. The liquid forced by the two pumps takes the course indicated by the dotted line and also the solid line—that is, circulating through the same, without operating the liquid motor or motors.

The advantages of the described arrangement are in having all valves movable by a single hand-lever, and in assuring that the braking position can be reached immediately from any other position, it being immaterial whether the machine is running forward or backward, merely by shifting the hand lever in one continuous direction. A single lever means not only great simplicity but also an easier supervision of the apparatus, and a lessening of the danger that, at critical moments, the operator will not work the controlling valves sufficiently quickly and correctly. The security against error is further assured by the fact that the hand-lever has always to be moved only to its end or extreme position.

What I claim is:

1. In a device for controlling fluid transmission gears, a plurality of valves for controlling the speed of a motor and also the braking thereof, said valves having projections, slides having grooves engaged by said projections and means for giving sliding movements as desired to said slides, the grooves of the slides being so formed that the valves are operated from neutral position, to slow speed, to medium speed, to high speed, and then to braking position, in the order named by movement of the slides in one direction.

2. In a device for controlling fluid transmission gears, a plurality of valves for controlling the speed of a motor and also the braking thereof, slides for operating said valves and means, including a single handle, for moving the slides, the connections of the slides with the valves being such that the valves are operated from neutral position, to slow speed, to medium speed, to high speed, and then to braking position, in the order named by movement of the slides in one direction.

3. In a device for controlling fluid transmission gears, a plurality of valves for controlling the speed of a motor and also the braking thereof, a movable means, and connections whereby the valves are operated from neutral position, to slow speed, to medium speed, to high speed, and then to braking position, in the order named by movement of the movable means in one direction effecting a movement of the slides in one direction.

4. In a device for controlling transmission gears, the combination of a motor; driving means for driving the motor; a plurality of valves interposed between said driving means and the motor for controlling the speed of the motor and the braking thereof; and controlling means for effecting a valve movement corresponding to highest speed of the motor by movement of said controlling means in a certain direction and effecting the braking movement by movement of said controlling means in said same certain direction to the next operative valve position of the controlling means.

5. In a device for controlling fluid transmission gears, a plurality of valves movable independently of one another, for controlling the speed of a motor, a slide for operating both said valves in a predetermined order; a valve for controlling the braking of said motor; a slide for operating said last-mentioned valve; and a single operating handle and connections therefrom to both slides.

6. A regulating device for controlling fluid transmission gears and comprising a pair of supply valves, operating independently of each other; a single slide for operating both of said valves as desired; a braking valve; a slide for operating the last-named valve as desired; a rocking bar; an operating handle connected with said bar; and levers secured to said bar and connected with both slides aforesaid.

In testimony whereof, I have signed my name to this specification in the presence of two subscribing witnesses.

HUGO LENTZ.

Witnesses:
 JAKOB KRAUS,
 A. O. TITTMANN.